United States Patent
Gorman et al.

(10) Patent No.: US 9,441,853 B2
(45) Date of Patent: Sep. 13, 2016

(54) TEFLON POCKET SLIDE GATE AND METHOD OF ASSEMBLY

(71) Applicant: RUSKIN COMPANY, Grandview, MO (US)

(72) Inventors: Paul T. Gorman, Prairie Village, KS (US); Mark W. Bronson, Grandview, MO (US)

(73) Assignee: RUSKIN COMPANY, Grandview, MO (US)

( * ) Notice: Subject to any disclaimer, the term of this patent is extended or adjusted under 35 U.S.C. 154(b) by 122 days.

(21) Appl. No.: 14/081,851

(22) Filed: Nov. 15, 2013

(65) Prior Publication Data
US 2015/0135597 A1    May 21, 2015

(51) Int. Cl.
*F24F 13/12*    (2006.01)
*F16K 3/02*    (2006.01)
*F24F 13/02*    (2006.01)

(52) U.S. Cl.
CPC .............. *F24F 13/12* (2013.01); *F16K 3/0236* (2013.01); *F24F 13/02* (2013.01)

(58) Field of Classification Search
CPC .......... F24F 13/12; F24F 13/02; F24F 13/20; E06B 1/02; E06B 1/32; E06B 7/18; E06B 1/52; F16K 3/0236
USPC .................................. 251/326–329; 454/334
See application file for complete search history.

(56) References Cited

U.S. PATENT DOCUMENTS

| | | | | |
|---|---|---|---|---|
| 2,731,231 A | * | 1/1956 | Garrott ................ | F16K 3/0263 251/328 |
| 2,814,244 A | * | 11/1957 | Hord ........................ | F24F 1/04 454/203 |
| 2,815,187 A | * | 12/1957 | Hamer ...................... | F16K 3/12 251/327 |
| 3,045,963 A | * | 7/1962 | Herrmann ................. | F16K 3/12 251/270 |
| 3,356,334 A | * | 12/1967 | Domer Scaramucci ......... | F16K 3/0227 251/172 |
| 3,799,187 A | * | 3/1974 | Armstrong ............ | F16K 3/0281 137/246.22 |
| 3,906,992 A | * | 9/1975 | Leach .................... | F16K 3/0272 137/315.3 |
| 4,163,544 A | * | 8/1979 | Fowler .................. | F16K 5/0673 251/315.08 |
| 4,182,359 A | | 1/1980 | Rickard | |
| 4,193,581 A | * | 3/1980 | Eilers ..................... | F16K 3/186 251/167 |
| 4,221,307 A | * | 9/1980 | Peterson ............... | F16K 3/0227 222/428 |
| 4,253,483 A | | 3/1981 | Cornelius | |
| 4,429,710 A | * | 2/1984 | Grieves .................... | F16K 3/02 251/328 |
| 4,582,296 A | | 4/1986 | Bachmann | |
| 4,700,927 A | | 10/1987 | Henderson | |
| 4,773,627 A | * | 9/1988 | King ..................... | F16K 3/0281 251/328 |
| 4,783,048 A | | 11/1988 | St. Clair | |
| 5,660,371 A | * | 8/1997 | Davis .................... | F16K 3/0281 251/327 |
| 8,251,786 B2 | | 8/2012 | Gasser | |
| 2009/0114872 A1 | * | 5/2009 | Syvertsen ................. | F16K 3/12 251/328 |
| 2009/0121173 A1 | * | 5/2009 | Devine, Jr. ........... | F16K 3/0227 251/328 |

* cited by examiner

*Primary Examiner* — John Bastianelli
(74) *Attorney, Agent, or Firm* — Jackson Walker LLP; Christopher J. Rourk

(57) ABSTRACT

A frame assembly that includes a frame side, a channel disposed in the frame side and a Teflon guide disposed in the channel, the Teflon guide having a seal feature and a guide feature.

19 Claims, 7 Drawing Sheets

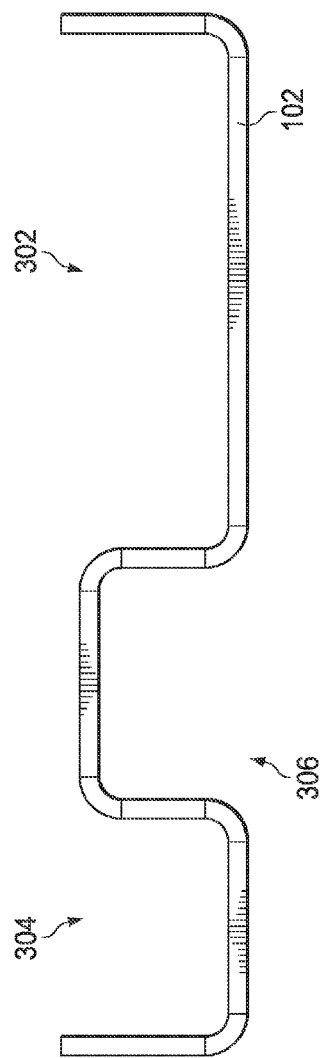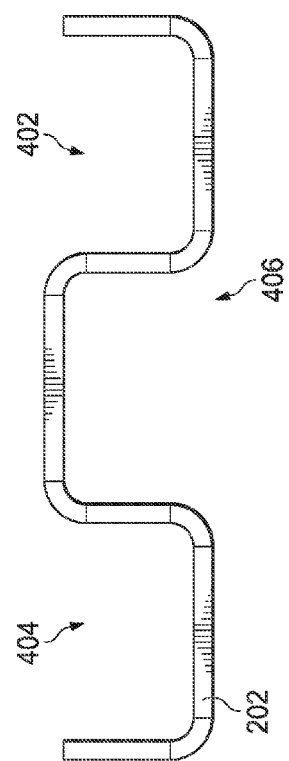
FIG. 3
FIG. 4

TEFLON POCKET SLIDE GATE AND METHOD OF ASSEMBLY

TECHNICAL FIELD

The present disclosure relates generally to air handling equipment, and more specifically to a Teflon pocket slide gate that eliminates the need for placing threaded fasteners in the air stream.

BACKGROUND OF THE INVENTION

Air handling equipment is used to control the flow of heating, ventilation and air conditioned (HVAC) air in buildings.

SUMMARY OF THE INVENTION

A frame assembly is disclosed that includes a frame side, a channel disposed in the frame side and a Teflon guide disposed in the channel. The Teflon guide has a seal feature and a guide feature, so as to allow the Teflon guide to be secured in place without the use of threaded fasteners, which could compromise the integrity of the seal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 3 is a diagram showing a profile of an ambient frame side in accordance with an exemplary embodiment of the present disclosure;

FIG. 4 is a diagram showing a profile of a system frame side in accordance with an exemplary embodiment of the present disclosure;

DETAILED DESCRIPTION OF THE INVENTION

Figure 1:
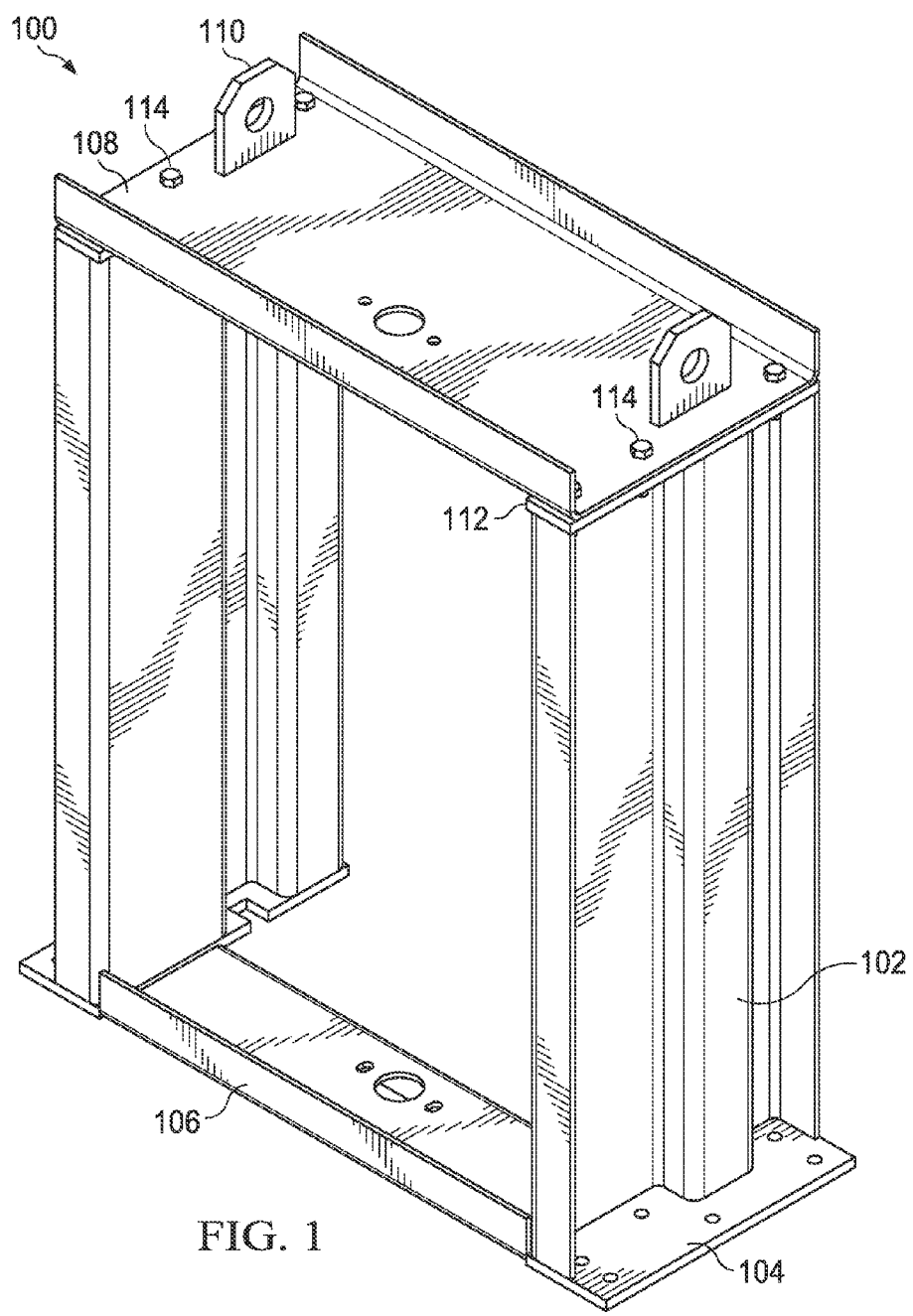
FIG. 1 is a diagram of an ambient frame assembly in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of an ambient frame assembly 100 in accordance with an exemplary embodiment of the present disclosure. Ambient frame assembly 100 and the other metal components and assemblies disclosed herein can be formed from steel, aluminum or other suitable materials, by processing such as extrusion, punching, laser cutting, die cutting or other suitable processes.

Ambient frame assembly 100 includes frame sides 102, which are disposed between front end assembly 108 and rear end assembly 106, which are coupled to frame sides 102 by bolts 114 that are attached to end plates 104 and 112. Rivets, screws, spot welding or other suitable connectors can also or alternatively be used to couple front end assembly 108 and rear end assembly 106 to frame sides 102. End plates 104 and 112 are connected to frame sides 102 by brazing, TIG welding, arc welding or in other suitable manners. Tabs 110 are attached to front end assembly 108 by brazing, TIG welding, arc welding or in other suitable manners.

In operation, ambient frame assembly 100 is disposed in an ambient environment outside of associated ductwork, and houses a blade assembly and driver (not shown), that is used to open and close a duct in a ventilation passage slide gate. Ambient frame assembly 100 is configured to use Teflon guide seals, to help maintain a low-leakage environment for the slide gate.

Figure 2:
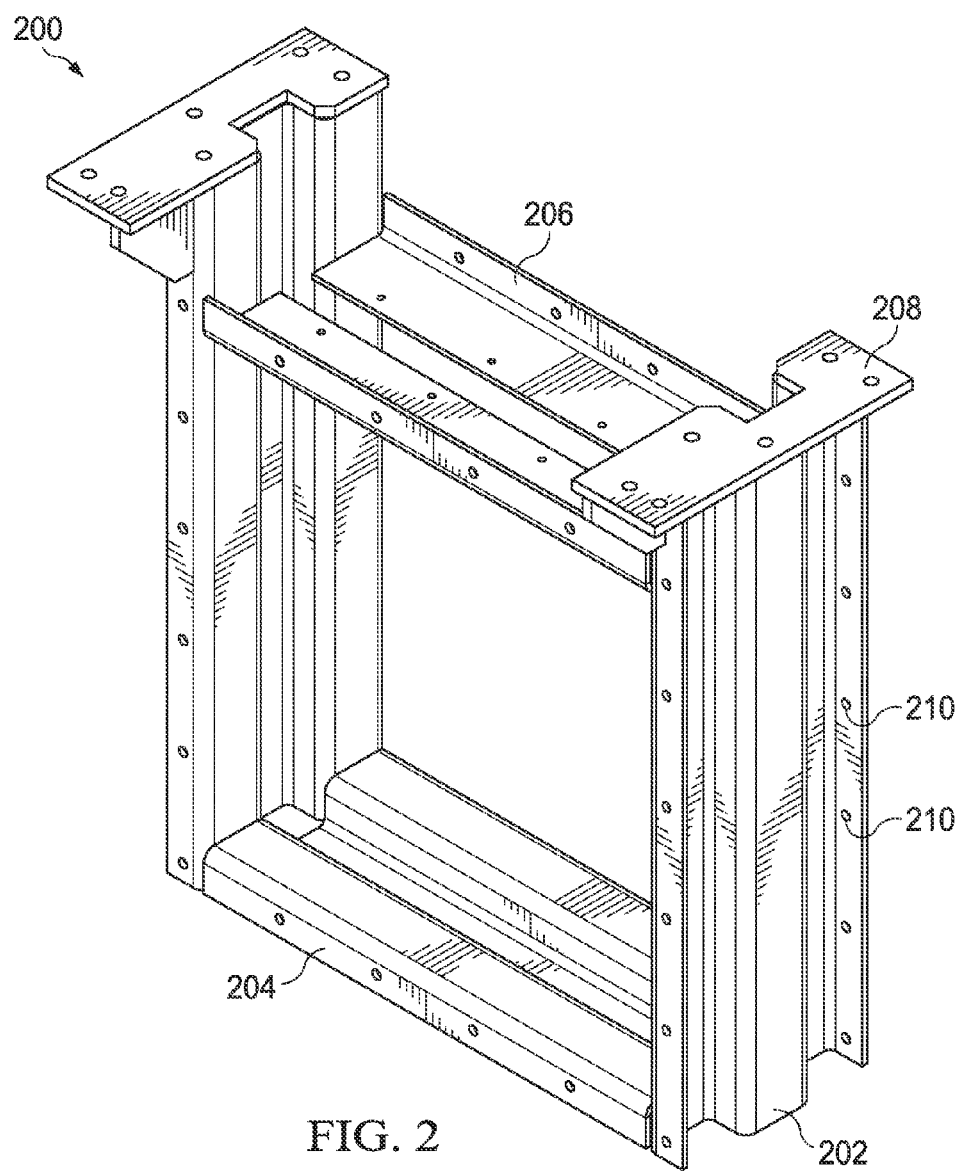
FIG. 2 is a diagram of a system frame assembly in accordance with an exemplary embodiment of the present disclosure.

FIG. 2 is a diagram of a system frame assembly 200 in accordance with an exemplary embodiment of the present disclosure. System frame assembly 200 bolts to ambient frame assembly 100, and provides the frame for a slide gate that is disposed in an HVAC ventilation passageway.

System frame assembly 200 includes frame sides 202, which are disposed between front end assembly 208 and rear frame side 204. Frame sides 202 include a plurality of holes 210, which are used to secure system frame assembly 200 to HVAC ductwork, and which can be formed by punching, drilling or in other suitable manners. Front end assembly 208 is coupled to frame sides 202 by bolts 114 that are attached to end plates 208. Rivets, screws, spot welding or other suitable connectors can also or alternatively be used to couple front end assembly 208 and rear frame side 204 to frame sides 202. End plates 208 are connected to frame sides 202 by TIG welding, arc welding or in other suitable manners. Rear frame side 204 is attached to frame sides 202 by TIG welding, arc welding or in other suitable manners. Front bracket 206 is coupled to frame sides 202 by welding or in other suitable manners, and has holes for connection to HVAC ductwork and additional holes for securing a seal made from stainless steel or other suitable materials to system frame assembly 200.

In operation, system frame assembly 200 is coupled to ambient frame assembly 100 using end plate 208, which is bolted to end plate 104 of ambient frame assembly 100, or in other suitable manners. Seals are disposed in frame sides 202 and rear frame side 204, which help to provide a seal between the inner HVAC duct environment and the external ambient environment.

FIG. 3 is a diagram showing a profile of an ambient frame side 102 in accordance with an exemplary embodiment of the present disclosure. Ambient frame side 102 includes major side section 302 and minor side section 304, which form the sides of the duct interface that connects to the duct that the assembled slide gate is used with. Major side section 302 is larger than minor side section 304 in order to allow ambient frame assembly 100 to accommodate a blade drive assembly (not shown), which can be used to remotely control the state of the slide gate (i.e. open or closed). Ambient frame side 102 further includes Teflon guide pocket 306, which is used to hold a Teflon guide assembly (not shown) that is used to allow a blade assembly (not show) to be placed in an air flow path of an air duct, such as to open or close the air flow path in the HVAC ductwork.

FIG. 4 is a diagram showing a profile of a system frame side 202 in accordance with an exemplary embodiment of the present disclosure. Ambient frame side 202 includes side section 402 and side section 404, which form the sides of the duct interface that connects to the duct that the assembled slide gate is used with. Unlike ambient frame side 102, the side sections 402 and 404 of system frame side 202 can be the same size. System frame side 202 further includes Teflon guide pocket 406, which is used to hold a Teflon guide assembly (not shown) that is used to allow a blade assembly (not show) to be placed in an air flow path of an air duct, such as to open or close the air flow path.

Figure 5:
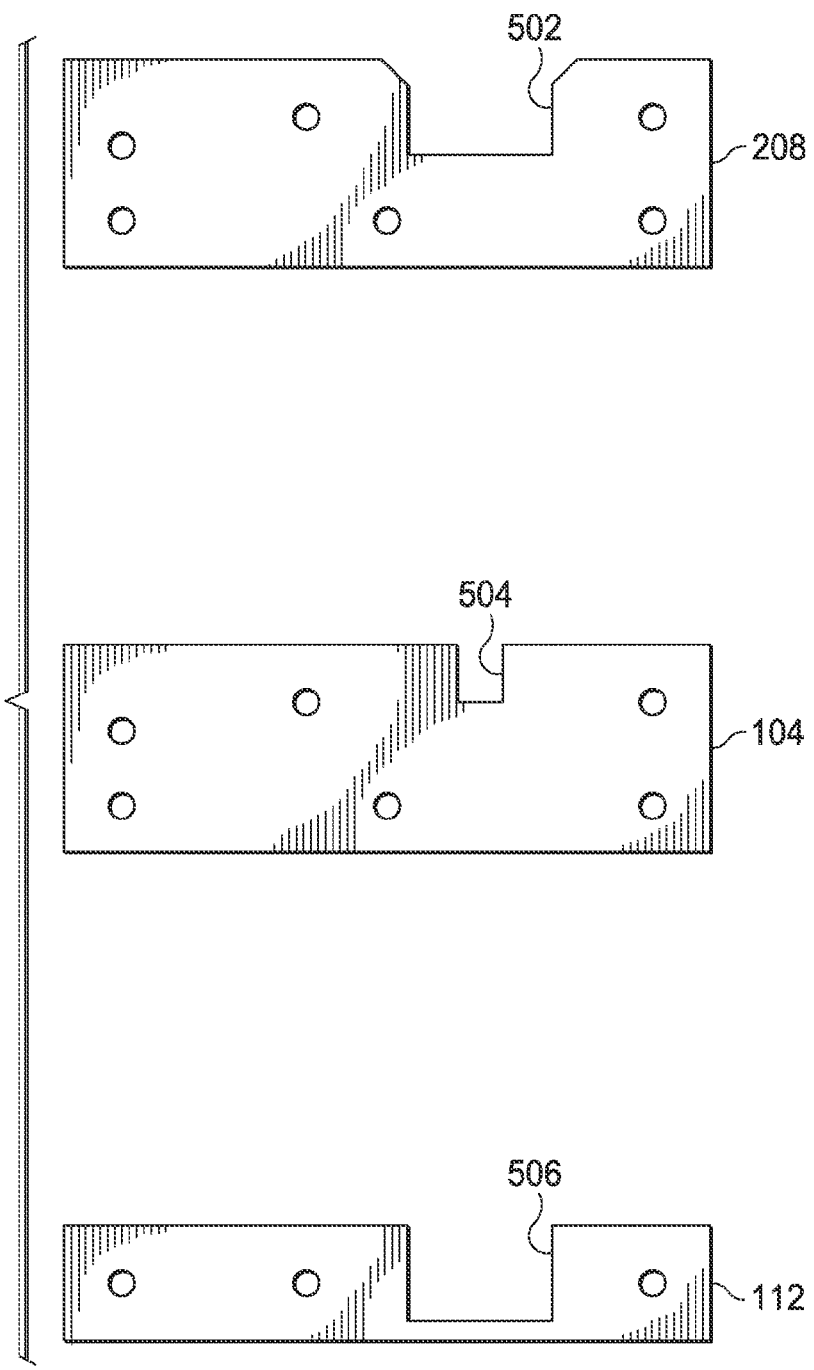
FIG. 5 is a diagram showing ambient and system end plates in accordance with an exemplary embodiment of the present disclosure.

FIG. 5 is a diagram showing ambient end plates 104 and 112 and system end plates 208 in accordance with an exemplary embodiment of the present disclosure. System end plate 208 includes Teflon channel slot 502, which is configured to allow a Teflon guide assembly to be inserted into Teflon guide pocket 406 of system frame side 202. In contrast, blade slot 504 of ambient end plate 104 is configured to allow a blade (not shown) to be inserted into ambient frame assembly 100, and channel slot 506 of ambient end frame 112 is not required to form an air-tight fit with a Teflon guide (not shown).

Figure 6:
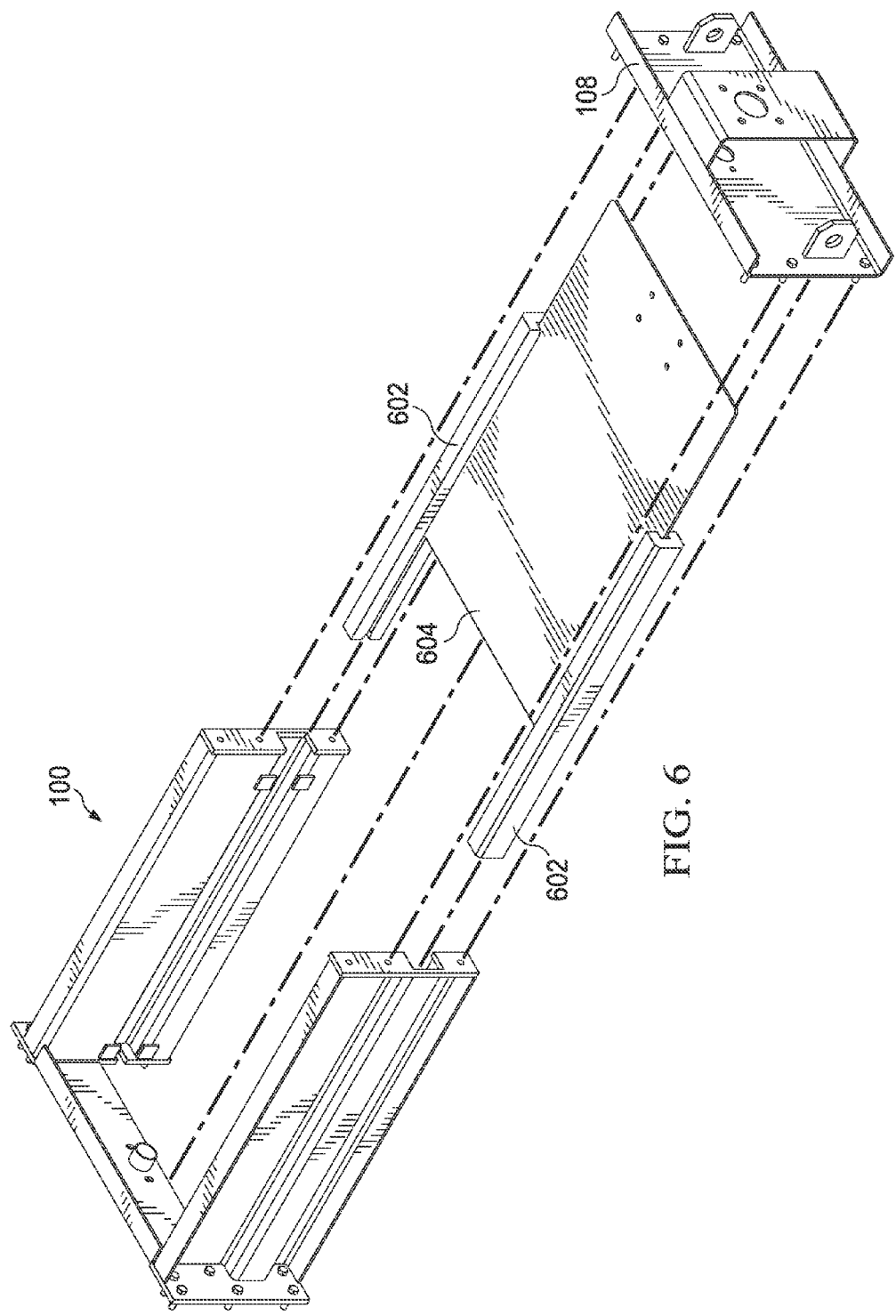
FIG. 6 is a diagram showing an exploded ambient frame assembly in accordance with an exemplary embodiment of the present disclosure.

FIG. 6 is a diagram showing an exploded ambient frame assembly 100 in accordance with an exemplary embodiment of the present disclosure. Ambient frame assembly 100 includes Teflon guide seals 602, which are inserted into Teflon guide pocket 306 of ambient frame sides 102. Blade 604 is then inserted into ambient frame assembly 100, such as to allow a duct to be selectively opened or closed. In addition, blade 604 has a length greater than the length of Teflon guide seals 602, so that blade 604 maintains the position of Teflon guide seals 602 in Teflon guide pockets 306 regardless of whether blade 604 is disposed entirely within ambient frame assembly 100 or system frame assembly 200.

Figure 7:
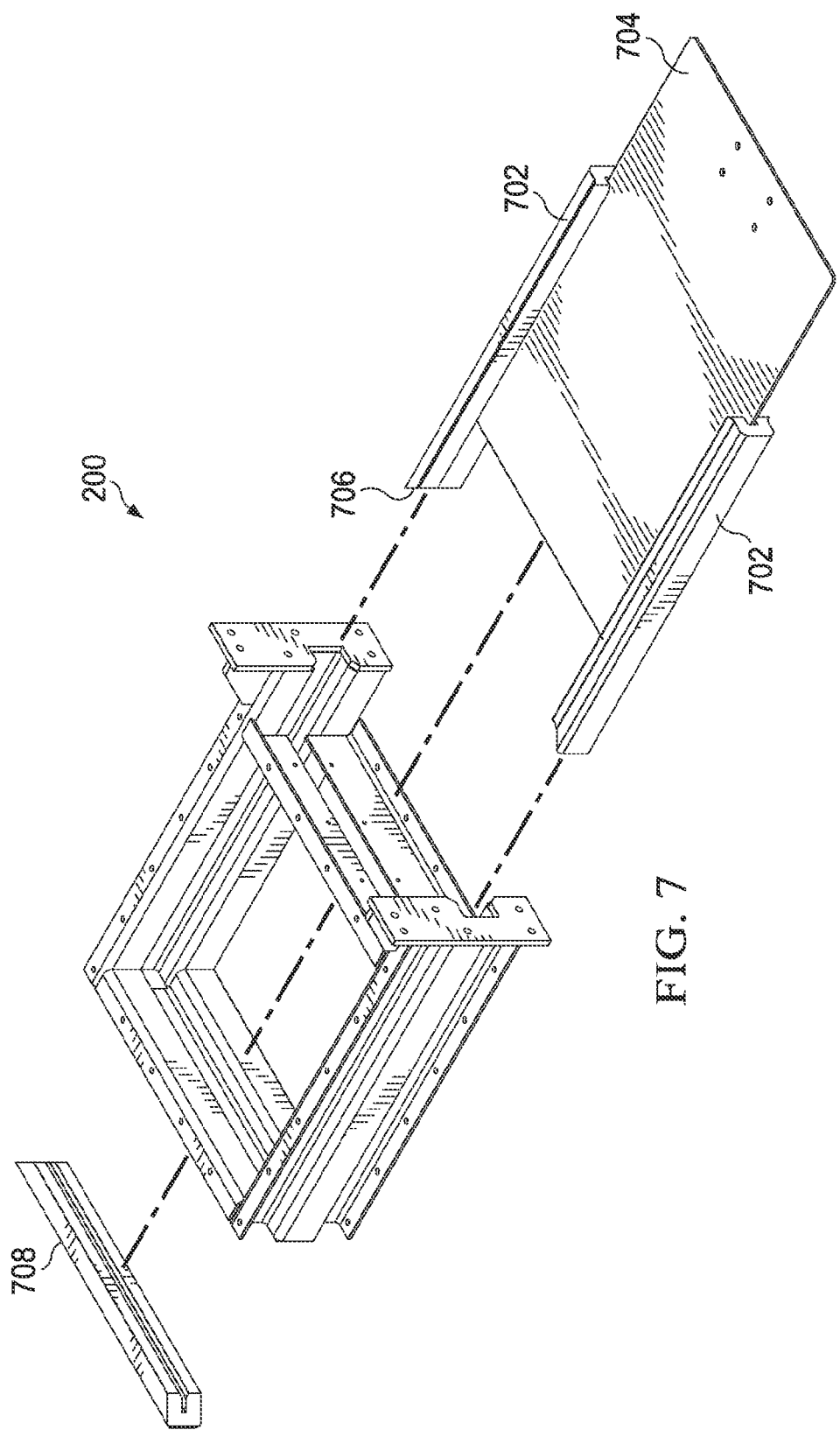
FIG. 7 is a diagram showing an exploded system frame assembly in accordance with an exemplary embodiment of the present disclosure.

FIG. 7 is a diagram showing an exploded system frame assembly 200 in accordance with an exemplary embodiment of the present disclosure. System frame assembly 200 includes Teflon guide seals 702, which have dovetailed ends 706 that are inserted into Teflon guide pocket 406 of system frame sides 202. System frame assembly 200 also includes Teflon guide seal 704, which includes dovetailed ends 708 that form an airtight seal against dovetailed ends 706 of Teflon guide seals 702. Blade 704 is then inserted into system frame assembly 200, such as to allow a duct to be selectively opened or closed. In one exemplary embodiment, blade 704 can be the same as blade 604.

Figure 8:
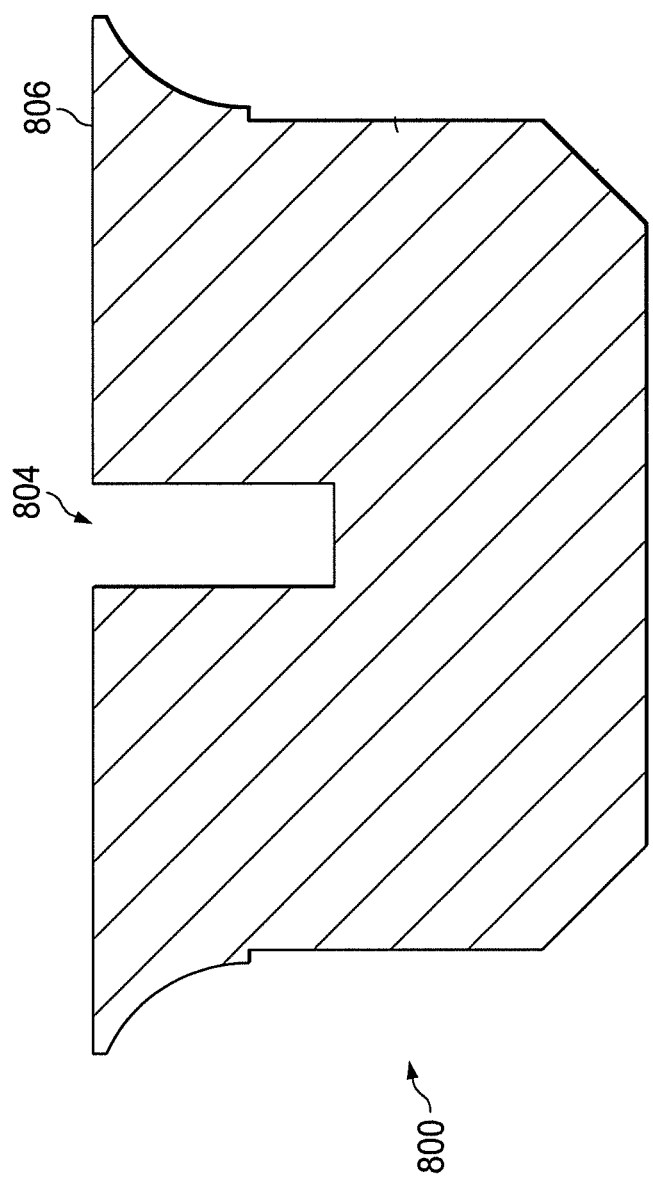
FIG. 8 is a diagram of a contoured Teflon guide in accordance with an exemplary embodiment of the present disclosure.

FIG. 8 is a diagram of a contoured Teflon guide 800 in accordance with an exemplary embodiment of the present disclosure. Contoured Teflon guide 800 includes seal 806, which forms an air tight seal against Teflon guide pockets 306 and 406 of ambient frame side 102 or system frame side 202, respectively. Blade slot 804 allows blade 604, blade 704 or other suitable components to be easily inserted and withdrawn from ambient frame assembly 100, system frame assembly 200 or other suitable components. Contoured Teflon guide 800 thus helps to prevent blade 604 or blade 704 in a frame assembly (or other suitable components in other suitable assemblies) from becoming stuck or frozen in place, and also provides an air tight seal with ambient frame assembly 100, system frame assembly 200 or other suitable components that does not require threaded fasteners to be used in an air stream, where such threaded fasteners can leak.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A frame assembly comprising:
a frame side;
a channel disposed in the frame side;
a Teflon guide disposed in the channel, the Teflon guide having a seal feature and a guide feature; and a front end plate coupled to the frame side, the front end plate having a channel slot with a contour that matches a contour of the channel.

2. The frame assembly of claim 1 further comprising:
a frame rear coupled to the frame side;
a channel disposed in the frame rear; and
a rear Teflon guide disposed in the channel of the frame rear.

3. The frame assembly of claim 2, wherein the Teflon guide and the rear Teflon guide each comprise a dovetail joint.

4. The frame assembly of claim 1 wherein the frame side further comprises a plurality of bolt holes configured to allow the frame side to be connected to ductwork.

5. A frame assembly comprising:
a frame side;
a channel disposed in the frame side;
a Teflon guide disposed in the channel, the Teflon guide having a seal feature and a guide feature; and a front end plate coupled to the frame side, the front end plate having a channel slot with a contour that is larger than a contour of the channel.

6. The frame assembly of claim 5 further comprising a rear end plate coupled to the frame side, the rear end plate having a channel slot with a contour that is smaller than the channel.

7. The frame assembly of claim 5 wherein the frame side further comprises a plurality of bolt holes configured to allow the frame side to be connected to ductwork.

8. A frame assembly comprising:
a first frame side;
a second frame side;
a first channel disposed in the first frame side;
a second channel disposed in the second frame side;
a first Teflon guide disposed in the first channel, the first Teflon guide having a seal feature and a guide feature;
a second Teflon guide disposed in the second channel, the second Teflon guide having a seal feature and a guide feature; and a front end plate coupled to the first frame side and the second frame side, the front end plate having a channel slot with a contour that matches a contour of the first channel and the second channel.

9. The frame assembly of claim 8 further comprising:
a frame rear coupled to the first frame side and the second frame side;
a channel disposed in the frame rear; and
a rear Teflon guide disposed in the channel of the frame rear.

10. The frame assembly of claim 9, wherein the first Teflon guide, the second Teflon guide and the rear Teflon guide each comprise a dovetail joint.

11. The frame assembly of claim 8 wherein the first frame side and the second frame side further comprise a plurality of bolt holes configured to allow the first frame side to be connected to first ductwork and the second frame side to be connected to second ductwork.

12. A frame assembly comprising:
a first frame side;
a second frame side;
a first channel disposed in the first frame side;
a second channel disposed in the second frame side;
a first Teflon guide disposed in the first channel, the first Teflon guide having a seal feature and a guide feature;
a second Teflon guide disposed in the second channel, the second Teflon guide having a seal feature and a guide feature; and a front end plate coupled to the first frame side and the second frame side, the front end plate having a channel slot with a contour that is larger than a contour of the first channel and the second channel.

13. The frame assembly of claim 12 further comprising a rear end plate coupled to the first frame side and the second frame side, the rear end plate having a channel slot with a contour that is smaller than the first channel and the second channel.

14. The frame assembly of claim 12 wherein the first frame side and the second frame side further comprise a plurality of bolt holes configured to allow the first frame side to be connected to first ductwork and the second frame side to be connected to second ductwork.

15. A frame assembly comprising:
a first frame side having a plurality of bolt holes configured to allow the first frame side to be connected to first ductwork;
a second frame side having a plurality of bolt holes configured to allow the second frame to be connected to second ductwork;
a channel disposed in the first frame side;
a front end plate coupled to the first frame side, the front end plate having a channel slot;
a Teflon guide disposed in the channel, the Teflon guide having a seal feature and a guide feature; and wherein the channel slot of the front end plate has a contour that is larger than a contour of the channel.

16. The frame assembly of claim 15 further comprising a frame rear coupled to the first frame side.

17. The frame assembly of claim 16 further comprising:
a channel disposed in the frame rear; and
a rear Teflon guide disposed in the channel of the frame rear.

18. The frame assembly of claim 16, wherein the Teflon guide and the rear Teflon guide each comprise a dovetail joint.

19. A frame assembly comprising:
a first frame side having a plurality of bolt holes configured to allow the first frame side to be connected to first ductwork;
a second frame side having a plurality of bolt holes configured to allow the second frame side to be connected to second ductwork;
a channel disposed in the first frame side; a front end plate coupled to the first frame side;
a Teflon guide disposed in the channel, the Teflon guide having a seal feature and a guide feature; and a rear end plate coupled to the frame side, the rear end plate having a channel slot with a contour that is smaller than the channel.

* * * * *